United States Patent
Karmarkar

(10) Patent No.: US 8,472,985 B2
(45) Date of Patent: Jun. 25, 2013

(54) INCENTIVE MARKETING WITH A CONTEXT-ENRICHED MESSAGE

(75) Inventor: Amit Karmarkar, Palo Alto, CA (US)

(73) Assignee: Buckyball Mobile, Inc, Palo Alto, CA (US)

( * ) Notice: Subject to any disclaimer, the term of this patent is extended or adjusted under 35 U.S.C. 154(b) by 453 days.

(21) Appl. No.: 12/720,130

(22) Filed: Mar. 9, 2010

(65) Prior Publication Data
US 2010/0205061 A1 Aug. 12, 2010

Related U.S. Application Data

(63) Continuation-in-part of application No. 12/422,313, filed on Apr. 13, 2009, which is a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
*H04W 4/14* (2009.01)

(52) U.S. Cl.
USPC ........... 455/466; 455/403; 370/328; 370/349; 370/496; 370/522

(58) Field of Classification Search
USPC ....................................................... 455/466
See application file for complete search history.

(56) References Cited

U.S. PATENT DOCUMENTS

| | | | |
|---|---|---|---|
| 6,785,869 B1 * | 8/2004 | Berstis | 715/210 |
| 6,819,268 B2 * | 11/2004 | Wakamatsu et al. | 340/988 |
| 6,966,035 B1 * | 11/2005 | Suess et al. | 715/753 |
| 6,990,333 B2 * | 1/2006 | Andrew et al. | 455/414.1 |
| 7,315,902 B2 * | 1/2008 | Kirkland | 709/247 |
| 7,366,500 B1 * | 4/2008 | Yalovsky et al. | 455/414.1 |
| 7,730,403 B2 * | 6/2010 | Johnson et al. | 715/705 |
| 2002/0107737 A1 * | 8/2002 | Kaneko et al. | 705/14 |
| 2002/0193996 A1 * | 12/2002 | Squibbs et al. | 704/260 |
| 2003/0009392 A1 * | 1/2003 | Perkowski | 705/26 |
| 2005/0017954 A1 * | 1/2005 | Kay et al. | 345/169 |
| 2005/0164703 A1 * | 7/2005 | Huynh | 455/432.3 |
| 2005/0245241 A1 * | 11/2005 | Durand et al. | 455/414.1 |
| 2006/0019724 A1 * | 1/2006 | Bahl et al. | 455/574 |
| 2006/0067250 A1 * | 3/2006 | Boyer et al. | 370/260 |
| 2006/0167992 A1 * | 7/2006 | Cheung et al. | 709/204 |
| 2007/0032244 A1 * | 2/2007 | Counts et al. | 455/456.1 |
| 2007/0094330 A1 * | 4/2007 | Russell | 709/206 |
| 2008/0133228 A1 * | 6/2008 | Rao | 704/231 |
| 2009/0030774 A1 * | 1/2009 | Rothschild et al. | 705/10 |
| 2009/0036097 A1 * | 2/2009 | Satou | 455/411 |

* cited by examiner

*Primary Examiner* — Lester Kincaid
*Assistant Examiner* — Diego Herrera

(57) ABSTRACT

Disclosed are a system, method, and article of manufacture of incentive marketing with a context-enriched message. In one embodiment, a message is generated with a computing device. A context of the computing device pertaining to a message component is determined. A context data derived from the context is linked with the message component. An ad message related to at least one of the context of the computing device and the message component is provided. The ad message may be associated with the message. The message and the ad message may be communicated to a recipient computing device. The ad message and the message may be rendered with a user interface.

22 Claims, 8 Drawing Sheets

INCENTIVE MARKETING WITH A CONTEXT-ENRICHED MESSAGE

CLAIM OF PRIORITY

This application is a continuation-in-part of and claims priority to patent application Ser. No. 12/422,313 filed on Apr. 13, 2009 which claims priority from provisional application 61/161,763 filed on Mar. 19, 2009. Patent application Ser. No. 12/422,313 is a continuation-in-part of patent application Ser. No. 11/519,600 filed Sep. 11, 2006, issued as U.S. Pat. No. 7,551,935. Patent application Ser. No. 11/519,600 is a continuation-in-part of patent application Ser. No. 11/231,575 filed Sep. 21, 2005, issued as U.S. Pat. No. 7,580,719.

FIELD OF TECHNOLOGY

This disclosure relates generally to a communication system, and, more particularly, to a system, a method and an article of manufacture of incentive marketing with a context-enriched message.

BACKGROUND

A computer system such as a mobile device may include sensors. The sensors may detect attributes of the mobile device's context. The mobile device may transform the detected attributes into context data. Thus, the mobile device may have certain context awareness available in a digital format. At the same time, the mobile device may also include a messaging application. A user of the mobile device may generate a message. Portions of the message may be relevant to the context of the mobile device. Information about this context may be useful to a receiver when reviewing the message. Moreover, portions of the message and/or the context may pertain to a vendor's goods or services. A vendor may be willing to provide an incentive to a user of the mobile device (and in some cases, a receiver of the message) to include an ad message with the message.

SUMMARY

A system, method, and article of manufacture of incentive marketing with a context-enriched message are disclosed. In one aspect, a message that is generated with a computing device is provided. A context of the computing device pertaining to a message component is determined. A context data derived from the context is linked with the message component. An ad message related to at least one of the context of the computing device and the message component is provided. The ad message may be associated with the message. The message and the ad message may be communicated to a recipient computing device. The ad message and the message may be rendered with a user interface.

In another aspect, a message is parsed with a server. A context data pertaining to an message element is obtained. The context data is associated with the element of the message. An announcement pertaining to at least one of the context data and the message element is obtained. The announcement may be associated with the element of the message. The message, the context data and the announcement may be delivered to a receiving mobile device.

In yet another aspect, a context manager component determines a mobile-device context. A message manager component determines a meaning of an message element. An incentive-marketing component provides an advertisement and links the advertisement to the message element according to the mobile-device context. A message manager component may configure a message comprising the message and the advertisement. The incentive-marketing component may determine whether a receiving mobile device displayed the advertisement. The incentive-marketing component may provide a credit to a user of a sending mobile device if the receiving mobile device displayed the advertisement.

In still yet another aspect, an advertisement is linked with a message according to a mobile-device context. At least one data packet comprising the linkage of the advertisement with the message may be generated.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a system, method, and article of incentive marketing with a context-enriched message. Although the present embodiments have been described with reference to specific example embodiments, it will be evident that various modifications and changes may be made to these embodiments without departing from the broader spirit and scope of the various claims.

Figure 1:
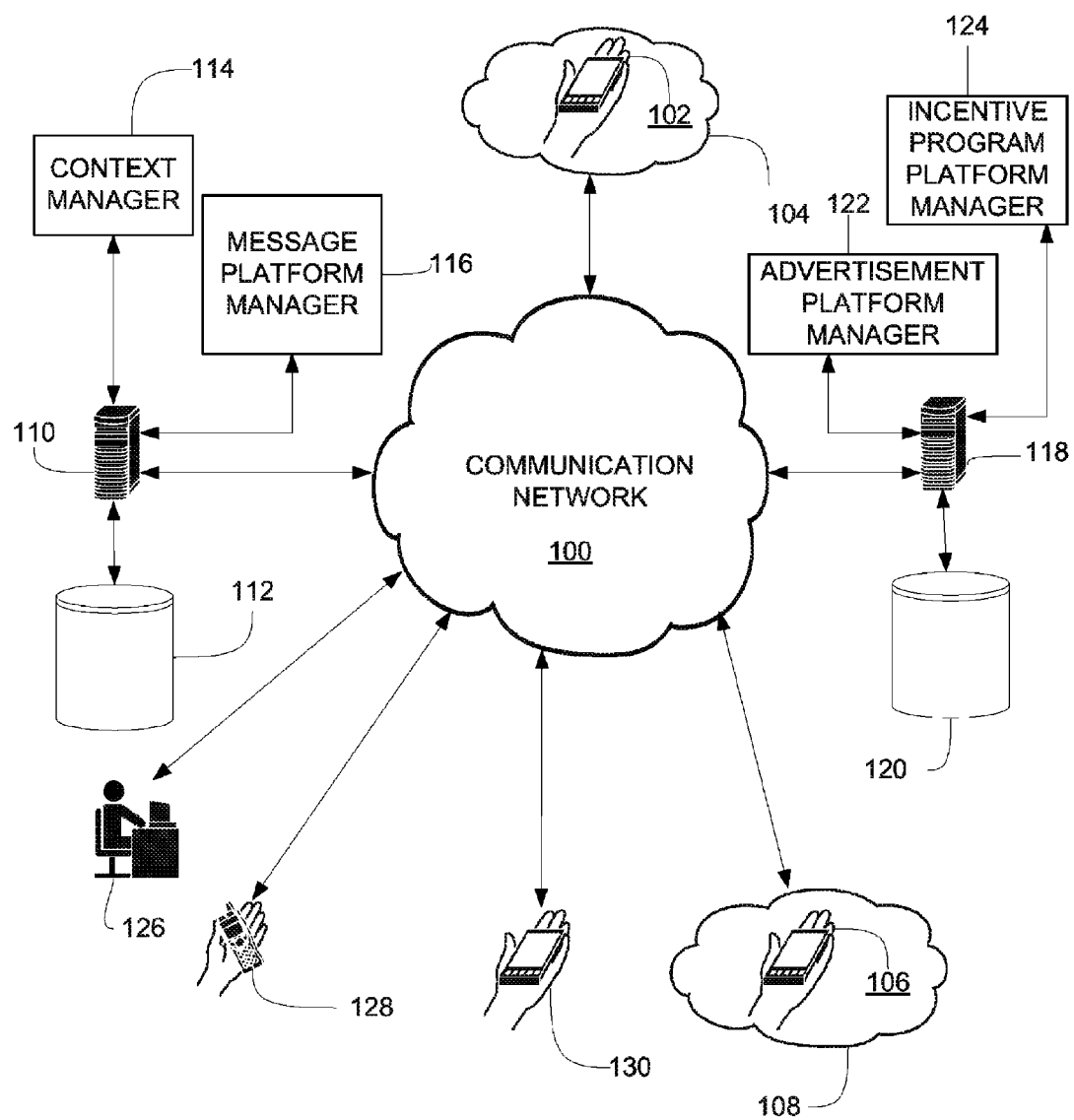
FIG. 1 illustrates a block diagram of an example context-enriched messaging network that implements one or more embodiments.

FIG. 1 illustrates a block diagram of an example context-enriched messaging network that implements one or more embodiments. The context-enriched messaging network includes a plurality of mobile devices 102, 106, 128, 130 communicatively coupled to a communication network 100. The mobile devices 102, 106, 128, 130 may be a smart-phone system such as the iPhone™, Motorola Droid™, Blackberry™, or the Nexus One™. It should be noted that in other example embodiments, other types of computing devices may perform the same operations as the mobile devices 102, 106, 128, 130. For example, client computer 126 may be a personal computer, a tablet computer, a portable media player, personal digital assistant, and/or Wi-Fi mobile platform, remote smart device according to one or more example embodiments. Consequently, FIG. 1 should not be interpreted as being exclusive only to mobile devices with regards to other example embodiments. The mobile devices 102, 106, 128, 130 are each carried and operated by a user and communicate with one another using known communication methods such as wireless telephony, radio, satellite, cellular systems, or other similar systems. For certain embodiments exemplified by FIG. 1, the mobile devices 102, 106, 128, 130 may be smart phones and the communication network 100 communicatively coupling these devices may include, inter alia, a packet oriented mobile data service (e.g. a general packet radio service (GPRS)), Enhanced Data rates for Global Evolution (EDGE) enhanced system, a universal mobile telecommunications service (UMTS), an IP telephony system or other architecture capable of delivering IP multimedia (e.g. IMS) to a mobile device. It should be noted that these network services are provided by way of example and not of limitation. Thus, other types of wireless networks that support mobile device communication can also be used (e.g. a cellular circuit-switch network). For example, the client computer 126 may be a personal computer and may still communicate with the other mobile devices 102, 106, 128, 130 via a TCP/IP protocol. Consequently, the communication network 100 may include gateways for interfacing between different types of networking systems.

In an example of one or more embodiments of FIG. 1, mobile devices 102, 106, 128, 130 may include context sensors (described infra). A context sensor may provide information about a context of the mobile devices 102, 106, 128, 130 (or even the client computer 126). For example, FIG. 1 shows that the sensors of mobile device 102 and 106 have been activated. Context information may then be acquired from the contexts 104 and 108. Context information of the mobile devices 102 and 106 may be converted into and quantified as context data by the various hardware, software and/or firmware systems of the mobile devices 102 and 106. Context data may then be encoded (e.g. in a data packet of a particular communication protocol such as short messaging service (SMS) or multimedia messaging service (MMS)) protocol and communicated to the other devices of the system of FIG. 1. Context data may also be associated with a component of a message generated by the mobile devices 102 and 106. A component of a message may be a word or a phrase included in the message. Various systems such as SMS, MMS, enhanced messaging service (EMS), voice messaging (e.g. voice mail, voice SMS, etc.) and/or IP Multimedia (IMS) systems may be utilized to generate and communicate the message. In this way, the messages generated by the mobile devices 102 and 106 can be contextually enriched and communicated to the various nodes of the communication network 100.

The mobile devices 102 and 106 communicate the context-data and the messages to a message server 110. The message server 110 executes a context manager 114 and a message-platform manager 116. The context manager 114 analyzes the context data and/or the message provided by the mobile devices 102 and 106. Example analysis operations include determining a quality of service, determining an attribute of a message component (e.g. time stamp, transmission protocol), determining a meaning of a message component, determining an attribute of a context data and/or determining a meaning of a context data. The context manager 114 then determines a context data to associate with the message component. Various types of data structures, classification approaches (such as those described infra with regards to machine learning systems) can be utilized to effectuate the operations performed by the context manager 114.

For example, the context manager 114 may determine an attribute of the message component. The context manager 114 may also determine a meaning of the attribute of the message component (e.g. with a table that includes both attributes and meanings of the attributes and/or with an automated semantic targeting platform). Furthermore, the context manager 114 may query third-party databases to acquire supplemental information about the context data. For example, a third-party server may provide a background map that represents a location context data. In another example embodiment, the context manager 114 may provide instructions to a mobile device 102 and 106 to acquire other types of context data and/or to update the context data. The context manager 114 may also provide instructions to the mobile devices 128 and 130 to activate a sensor (such as sensors 724 A-N described infra), acquire context data and then communicate the context data to a particular device or system of FIG. 1.

The context manager 114 associates the context-data with a message component. For example, the context manager 114 may modify a data packet used to transport the message data to include associated context-data and/or supplemental data about the context data. In another aspect, the context manager 114 may configure the message to include both message data and associated context-data (and in some embodiments include supplemental information about the context-data as well).

In another example aspect, the context manager 114 may modify the message data packet to include message data and metadata about the association of the message data with a context-data. The metadata may include instructions for a receiving mobile device 106 to render the message to indicate that a context data has been associated with a message component (e.g. as a hyperlink). The context manager 114 may then communicate the context-data in a separate data packet to a server that is accessible by the other devices and systems of FIG. 1. In this way, a receiving mobile device 106 may asynchronously acquire the context data in a separate message.

Machine learning systems (implicitly as well as explicitly trained) may be employed to provide automated action in connection with the operations performed by the context manager 114 (and/or the advertisement-platform manager 124 discussed in further detail infra). In other words, the certain embodiments may employ a machine-learning and reasoning component to facilitate automating one or more operations of the various embodiments described herein. Certain embodiments may employ various AI-based schemes for carrying out these operations. For example, the context manager 114 may utilize a machine-learning process to determine a context of mobile device 102 and/or associate the context-data with a message component. The determination and association operations may be facilitated by an automatic classifier system and process. A classifier is a function that maps an input attribute vector, x=(x1, x2, x3, x4, xn), to a confidence that the input belongs to a class, such as the f(x)=confidence (class). Such classification may employ a probabilistic and/or statistical-based analysis to infer an action or state of a mobile device. A support vector machine (SVM) is an example of a classifier that may be employed by the context manager 114. Other classification approaches include, e.g., naive Bayes, Bayesian networks, decision trees, neural networks, fuzzy logic models, and probabilistic classification models providing different patterns of independence may be employed.

Classification may also include statistical regression methods to develop models of priority. The context manager 114 may employ classifiers that are explicitly trained (e.g., via a generic training data) as well as implicitly trained (e.g., via observing user behavior, receiving extrinsic information). For example, SVM's may be configured via a learning or training phase within a classifier constructor and feature selection module. Thus, the classifier(s) may be used to automatically learn and perform a number of functions, including but not limited to determining, according to a predetermined criteria, such as where a mobile device (such as mobile devices 102, 106) is located, where the mobile device is going, what action a user is performing with the mobile device, what action a user is going to perform with the mobile device, the present context of the mobile device, a predicted future context of the mobile device and/or a higher-order context data, etc.

Statistical machine learning methods may be employed to build models that identify or rank informational items differently based on inferences about context data values, context attributes and meanings and/or message component attributes and meanings. Databases (e.g. the context-data store 112, the incentive-marketing data store 120 and/or the memory of the mobile devices 102, 106, 128 and 130) may store cases of events representing informational items, that were identified implicitly or explicitly as being desirable or valuable in specific contexts, may be used to build custom-tailored ranking functions that facilitate the operations performed by the context manager 114 (and/or the advertisement-platform manager 124). In some cases, context-sensitive parameters may be passed to ranking functions. In other cases, ranking functions may be more holistically optimized for performance in different operations and/or contexts. For example, in cases where there is uncertainty as to a particular context of the mobile device, inferences about the probability distributions over the potential contexts at hand may be taken as inputs in retrieval systems of the server 110 (and/or a mobile device 102, 106, 128 and 130). These retrieval systems may mix the outputs of multiple ranking systems in a probabilistically coherent manner to provide different kinds of mixtures of results, including an overall ranking and clusters of results, showing the most relevant for each of the potentially active clusters. The context manager 114 may also utilize these machine-learning systems in voice and sound recognition operations as well.

In other example embodiments, the mobile devices 102, 106, 128 and 130 may include utilities and/or applications that perform the functions of the context manager 114, the message-platform manager 116, the incentive-platform manager 122 and the advertisement-platform manager 124. Thus, the functions of the context manager 114, the message-platform manager 116, the incentive-platform manager 122 and the advertisement-platform manager 124 may be distributed and scaled throughout the systems of FIG. 1 in order to more efficiently utilize mobile-device processing resources and battery power. Additionally, various cloud-computing methodologies may also be utilized for purposes of distributing and scaling the resources of FIG. 1.

The message-platform manager 116 may provide tools to parse, decode, receive, analyze, encode and transmit messages of various types (such as SMS, MMS, voice) to the various messaging enabled devices of the system of FIG. 1. The message-platform manager 116 may also manage the store and forward operations performed by the message server 110. Additionally, the message-platform manager 116 may verify the integrity of a message before forwarding it. In another example embodiment, the message-platform manager 116 may forward the message and the associated context data (as well as supplemental data) to the incentive-marketing server 118. For example, the message-platform manager 116 may deconstruct a context-enriched message packet, copy certain message data from the packet, provide the copied data to the message server 110 for analysis, include additional information (e.g. context data) into the data portion of the context-enriched message packet and then reconstruct the context-enriched message packet forwarding.

The incentive-marketing server 118 executes the advertisement-platform manager 122 and the incentive-platform manager 124. The incentive-platform manager 124 executes an incentive network wherein vendor (e.g. a business or other entity that provides credits in exchange for a user including advertisements with context-enriched messages) and mobile-device users can register and participate in the incentive program. For example, each vendor and mobile-device user is provided an account accessed via a website supported via the incentive-marketing server 118. The vendor and mobile-device user can then track account information such as credits received, credits provided, statistical information, historical information, etc., as well as modify account settings.

The advertisement-platform manager 122 provides advertisements to the mobile devices 102, 106, 128, 130 and/or client computer 126. The advertisement-platform manager 122 to formats ad messages for display on the mobile devices 102, 106, 128, 130 and/or client computer 126. The advertisement-platform manager 122 may utilize the various data structures and operations described supra to select an ad message for a particular context-enriched message. This allows a advertiser to link an ad message with a user based directly on the meanings and attributes of context data and/or message components of a context-enriched message. For example, the advertisement-platform manager 122 may execute a contextual advertising system and/or a semantic advertising system.

In one example embodiment, the advertisement-platform manager 122 may reconfigure the context-enriched message packet to include ad message data in a similar process as described supra regarding the operation of the text-message-platform manager 116. In other example embodiments, the advertisement-platform manager 122 may copy portions of the message and/or context data from the message data portion (which may include both message and/or context data in certain example embodiments) of the context-enriched message packet. The advertisement-platform manager 122 may then forward the message to the appropriate node of the communication system for subsequent delivery to a final recipient mobile device. The advertisement-platform manager 122 may then communicate the ad message to the final recipient mobile device separately from the context-enriched message packet.

The ad messages can be provided in the form of banner ad messages, advertisement screens, sponsored maps, and the like. The ad messages can be in the form of text, graphics, animation, logo, trademark or any other suitable format. Other forms of ad messages include customized or branded display backgrounds or VI "skins".

The advertisement-platform manager 122 provides ad messages based on user profile information. While this particular example focuses on ad messages, it should be noted that in other example embodiments, the advertisement-platform manager 122 may provide other types of message such as reviews, and/or hyperlinks to sponsoring web pages. The advertisement-platform manager 122 may also query a database of past user behavior and supplement the ad message with user profile information (e.g. digital images of the user and/or the user's friends, past locations of the user, past user behavior). User profile information may be stored in the database 120. The user profile information may include user attributes such as the preferences, profile information (e.g. how often the user sends and/or receives messages), demographic information, updated location information. The advertisement-platform manager 122 may factor this information into an advertisement selection operation as well. The database 120 may also store ad messages, ad message/context associate tables, and/or other relevant data.

In one example embodiment, a user may temporarily opt out of participating in the incentive marketing process. Consequently, a mobile device 102 associated with the user will not have advertisements associated with context-enriched messages sent and/or received by the mobile device 102. The advertisement-platform manager 122 may provide a different ad message for different recipients if the sent message is a point-to-multipoint message.

In one embodiment, the advertisement-platform manager 122 provides a list of relevant vendor-related locations to the mobile device 102 (in other embodiments mobile devices 106, 128, 130 may also receive the same information). The advertisement-platform manager 122 then periodically updates the list according the current location of the mobile device 102. The list may also include particular types of context data and/or key message words associated with the vendor-related locations. If the user of mobile device 102 composes a message and includes context data and/or a particular key word, the list and the associated context data and/or key message words may appear on the user interface (described in further detail in the description of FIG. 6 infra) of the mobile device 102. The user may then choose to include particular context data and/or key word in the message, thus causing the advertisement-platform manager 122 to communicate the associated ad message to the recipient. Thus, the user has the ability to generate a context-enriched message in a prespecified manner set by a credit provider.

The incentive-platform manager 124 manages the awarding of credit to the users of the system of FIG. 1. In one embodiment, a user's account may receive credit for each ad message associated with a message transmitted by the mobile device 102 associated with the user. The user may receive additional credit if a recipient mobile device 106 later accesses the ad message as well. In one embodiment, credit may be redeemed in the forms of a coupon (e.g. a virtual coupon) and/or discounts for goods and services provided by participating vendors.

In an example embodiment, the incentive-platform manager 124 may also provide a mechanism for vendors to provide location-based coupons. In one example, the coupons may be delivered to users who have opted to receive discounts and promotions via messages. The service targets relevant coupons to users based on their location and the time of day. Coupons may be delivered as a text message (or, in other embodiments, a media message such as a video) through a messaging application, such as through displays, menus, banners, and the like. The coupon message may also include a link to a map that shows the nearest merchant location and/or directions to the location. The incentive-platform manager 124 may deliver notices of available coupons and promotions with an auto-alert feature that communicates an alert when the user or a friend is at or within a defined distance of a particular location.

In one embodiment, virtual coupons can be "clipped" and saved to a user's account for use at a later time. A user clips a coupon by selecting an appropriate command or key on the mobile device and saving the coupon to the user's account. For example, the user may utilize a mobile web browser of the mobile device 102 to access a web page with the user's account information. The incentive-platform manager 124 may modify the user's account according to input provided by the user. The incentive-platform manager 124 may communicate coupon redemptions and modifications to a server run by an vendor. In another embodiment, the mobile device 102 may run a local client version of a user account management component of the incentive-platform manager 124. Such a component may be a thin-client program, such as a Java program, running on mobile device 102, for example.

Generally, vendors may also interact with users via the message server 110 and the incentive-marketing server 118. For example, a user may be in a vendor's store. The user's mobile device may provide context data to the message server 110 of the user's location. The message server 110 may forward this information to a vendor's server coupled with the communication network 100. The vendor's server may communicate ad messages and/or invitations to the user's mobile device inviting the user to join the vendor's incentive marketing program. The invitation may also include credit incentives for joining.

Figure 2:
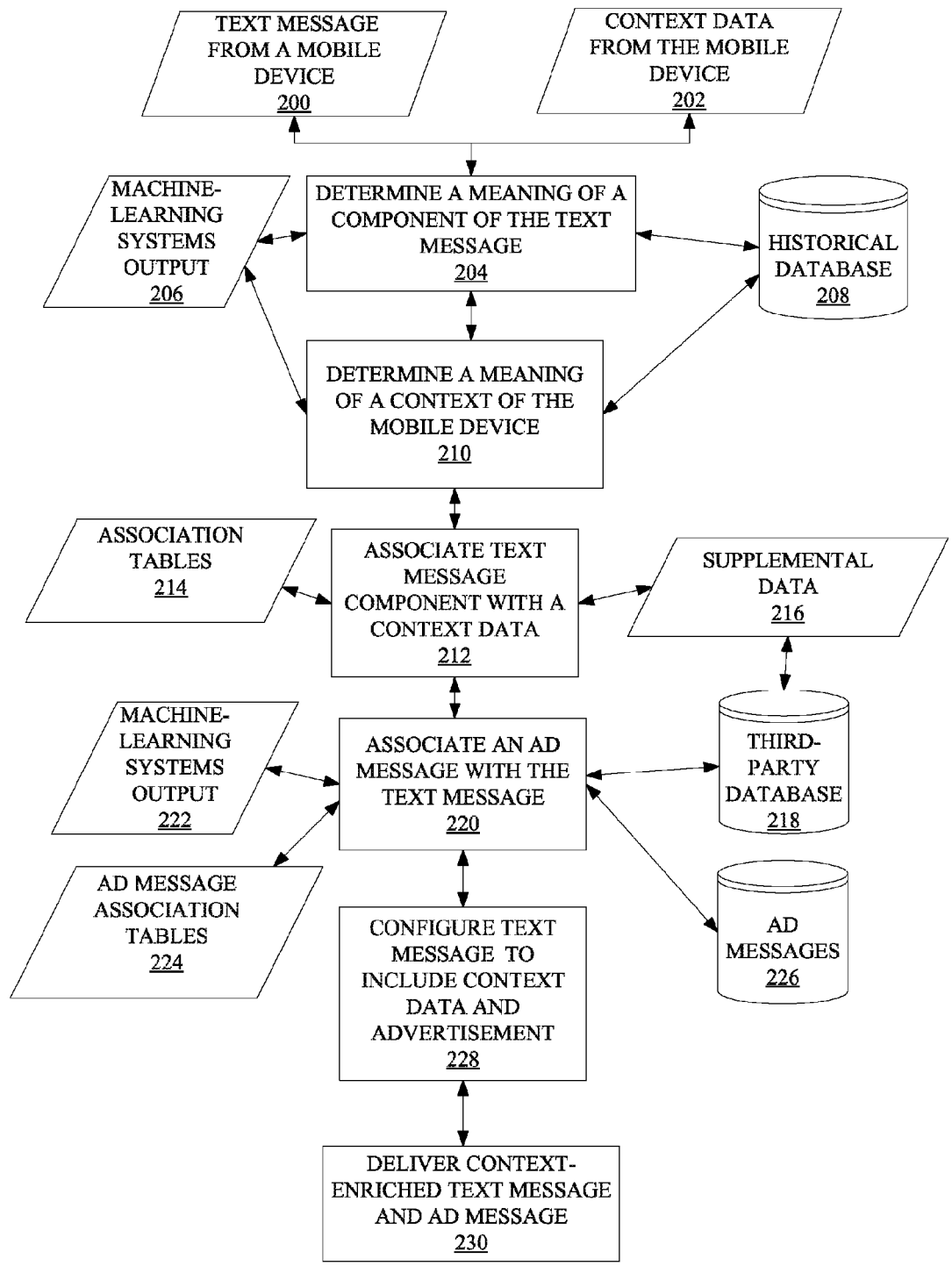
FIG. 2 is a flowchart that illustrates an example process of associating an ad message with a text message, according to an example embodiment.

FIG. 2 is a flowchart that illustrates an example process of associating an ad message with a context-enriched text message, according to an example embodiment. The systems and applications of FIGS. 1, 7 and 8 may be utilized to perform the operations of FIG. 2. In operation 200, a text message from a mobile device (such as mobile device 102) is provided. It should be noted that, in other example embodiments, the type of message need not be limited to a text messages. In operation 202, a context data from the mobile device is also provided. A sensor of the mobile device 102 may acquire the context data. In operation 204, a meaning of a text message component is determined. The message server 110 may perform operation 204. The server may utilize the message-platform manager 116 to execute operation 204. In operation 210, the context data is analyzed to determine a meaning of the context of the mobile device. The message server 110 may perform operation 210 by executing the context manager 114. Additionally, the message server 110 may also acquire data from the output of machine learning systems 206 (such as those described supra) and/or a historical database 208 to perform operation 210. For example, the machine learning systems may be utilized to clarify an ambiguity as to the context of the mobile device 102. The historical database 208 may be included in the context-data store 112. In operation 212, the text message component is associated with the context data. In one example, the context manager 114 may utilize the association tables 214 to perform operation 212. For example, the association tables may match particular context data with certain words and/or phrases of the text message. In other example, a language-independent proximity pattern matching algorithm may be utilized to increase matching accuracy. Operation 212 may also associate supplemental data 216 that includes additional information about the context data. For example, the supplemental data 216 may be acquired from a third-party database 218 via the Internet.

In operation 220, an ad message is associated with the text message. The ad message may be related to a word or phrase of the text message and/or a context of the sending mobile device. For example, a contextual advertising system may scan the message for keywords and/or context data values. The contextual advertising system may then utilize a database to link a located keyword and/or context with a particular ad message. In an alternative example, a semantic system may examine all the words in the message and identify the meaning (and/or sense) of each word. There are a variety of techniques by which this may be performed, one of which is by computing a context-data vector for the context-data types of the context-enriched message. The top N context-data types may then be selected from the context-data vector. The context-data type may be weighted according an associated text message component. For example, if the text message component is the term 'here', the location context-data types such as GPS data is provided greater weight than other context-data types not related to location. The top context-data types are then compared to target information associated with the ad messages (e.g., keywords specified for the ad messages) to determine which of the ad messages are relevant to the ad message. Some or all of these relevant ad messages may then be associated with the context-enriched message so that they may be rendered with the context enriched message by the receiving mobile device 106. In other example embodiments, each word in a message may also be weighed with a vector value. The incentive-marketing server 118 may implement these contextual advertising and semantic processes.

Furthermore, in certain example embodiments, machine-learning systems may be utilized to determine the ad message according to a variety of parameters such as the meaning of the context and the meaning of the text message component. Ad message association tables may also be used to match an ad message to a text message. For example, the ad message may be matched based on a context-data and/or text-message component. In certain example embodiments, multiple ad messages may be associated with the text message. Ad messages may be acquired from either a third-party database 218 and/or an ad messages database 226. The incentive-marketing server 118 may execute operation 220.

In operation 228, the text message is configured to include the context-data and the ad message. In operation 230, the context-enriched text message is then delivered to an addressed recipient device. For example, the context-enriched text message may be forwarded by the incentive-marketing server 118 to a network switch to be forwarded to mobile device 106.

Figure 3:
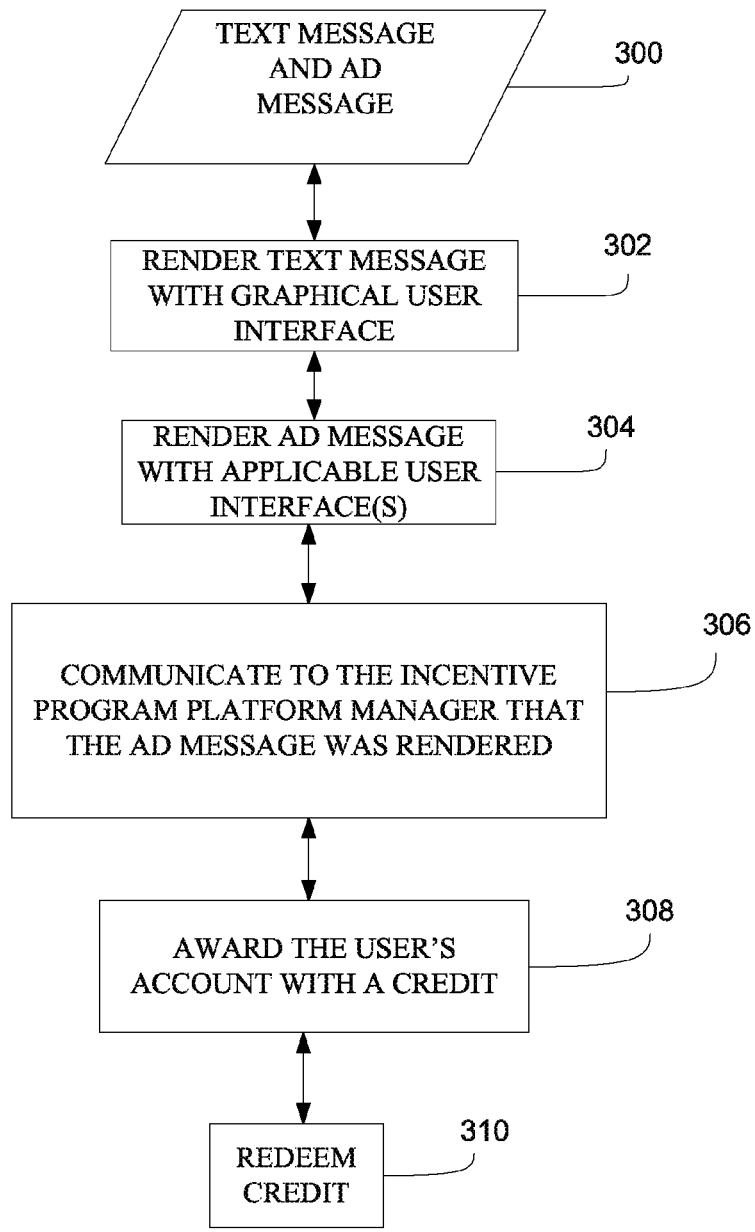
FIG. 3 illustrates a flowchart that illustrates an example process of providing credit to a user when an ad message is accessed by a receiving mobile device, according to an example embodiment.

FIG. 3 illustrates a flowchart that illustrates an example process of providing credit to a user when an ad message is accessed by a receiving mobile device, according to an example embodiment. In certain embodiments, the process of FIG. 3 may be a continuation of the process of FIG. 2. In operation 300, a context-enriched text message and an ad message are received. For example, the context-enriched text message and ad message may be forwarded by the incentive-marketing server 118 through the communication network 100 to the mobile devices 102, 106, 128, 130. In operation 302, the context-enriched text message is rendered with a GUI. In operation 304, the ad message is then rendered with an appropriate user interface. For example, audio elements of the ad message may be rendered with a speaker and a visual element may be rendered with a GUI. In operation 306, a communication is transmitted to the incentive-program platform manager 122 that the ad message was rendered. For example, a receiving mobile device 106 may render the ad message. A data packet that included the ad message data may also include an instruction for the receiving mobile device to generate a message informing the incentive program platform manager 122 when the ad message is rendered. In operation 308, a sending user (i.e. the user of the mobile device that originally generated the message) account is awarded with a credit. The credit may be a coupon that is transmitted to the sending user's mobile device 102 in the form of a context-enriched text message (see example provided in FIG. 5 infra).

In operation 310, a user may redeem the credit. In a particular example, a user user's account may be credited with a virtual coupon. The user may remit the virtual coupon in situ while purchasing a particular item. For example, the user may communicate another context-enriched text message comprising "I want this" to a vendor-operated server. The mobile device 102 may utilize a context-data sensor (e.g. an RFID or Bluetooth™ device) to associate a context data representing the item with the term 'this'. The vendor-operated server may use the user's virtual coupons as credit toward the user's purchase. The vendor-operated server may then inform the store where the user is located that the user's purchase is complete.

Figure 4:
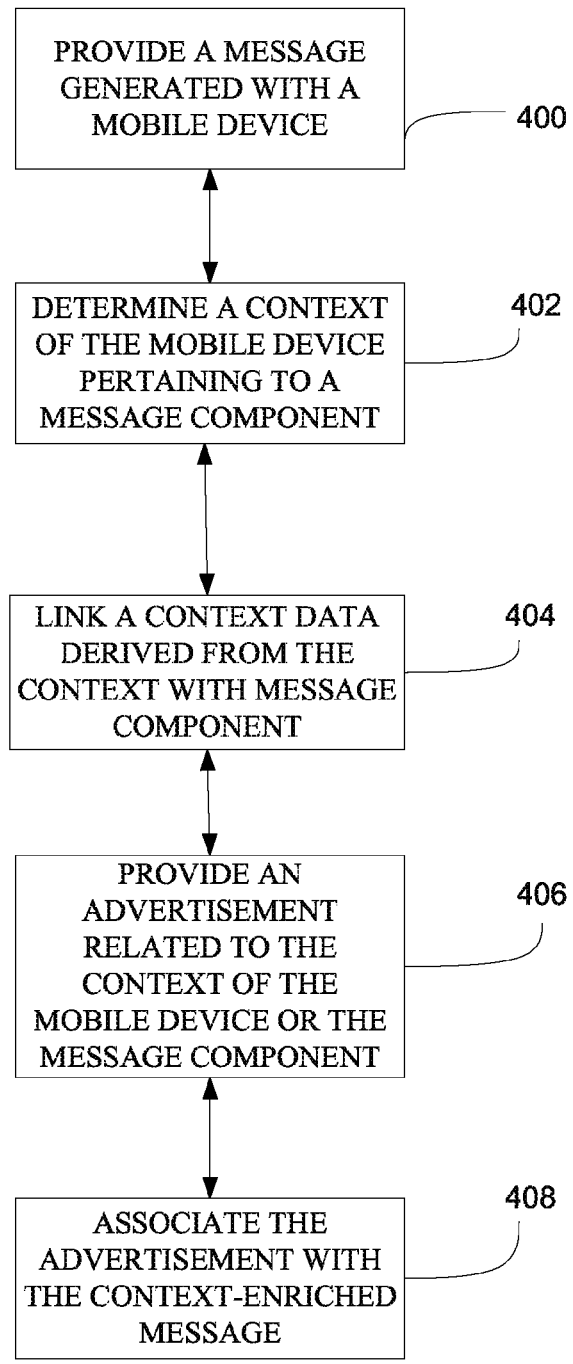
FIG. 4 illustrates a flowchart that illustrates an example method of associating an advertisement with a message, according to another example embodiment.

FIG. 4 is a flowchart that illustrates an example method of associating an advertisement with a message, according to another example embodiment. As discussed supra, an advertisement may be an ad message, a review and/or a hyperlink to a particular website. In operation 400, a message (e.g. text, voice, multimedia) generated with a mobile device 102 is provided. In operation 402, a context of the mobile device 102 pertaining to a message component is determined. For example, the message component may be a particular word, phrase, image, sound and/or inflection of a spoken voice. In operation 404, a context-data derived from the context is linked with the message component. For example, in one embodiment, a context manager 114 resident on the mobile device 102 may utilize a context-data sensor to acquire a signal pertaining to a contextual event or entity. The signal may be encoded into a computer-readable format as context data. In operation 406, an advertisement related to the context of the mobile device and/or a message component is provided. In operation 408, the advertisement is associated with the context-enriched text message. For example, a server may communicate an instruction to a receiving mobile device to render the message and the advertisement either simultaneously or sequentially. The elements of FIGS. 1 and 6-8 may be utilized to perform operations 400-408.

Figure 5:
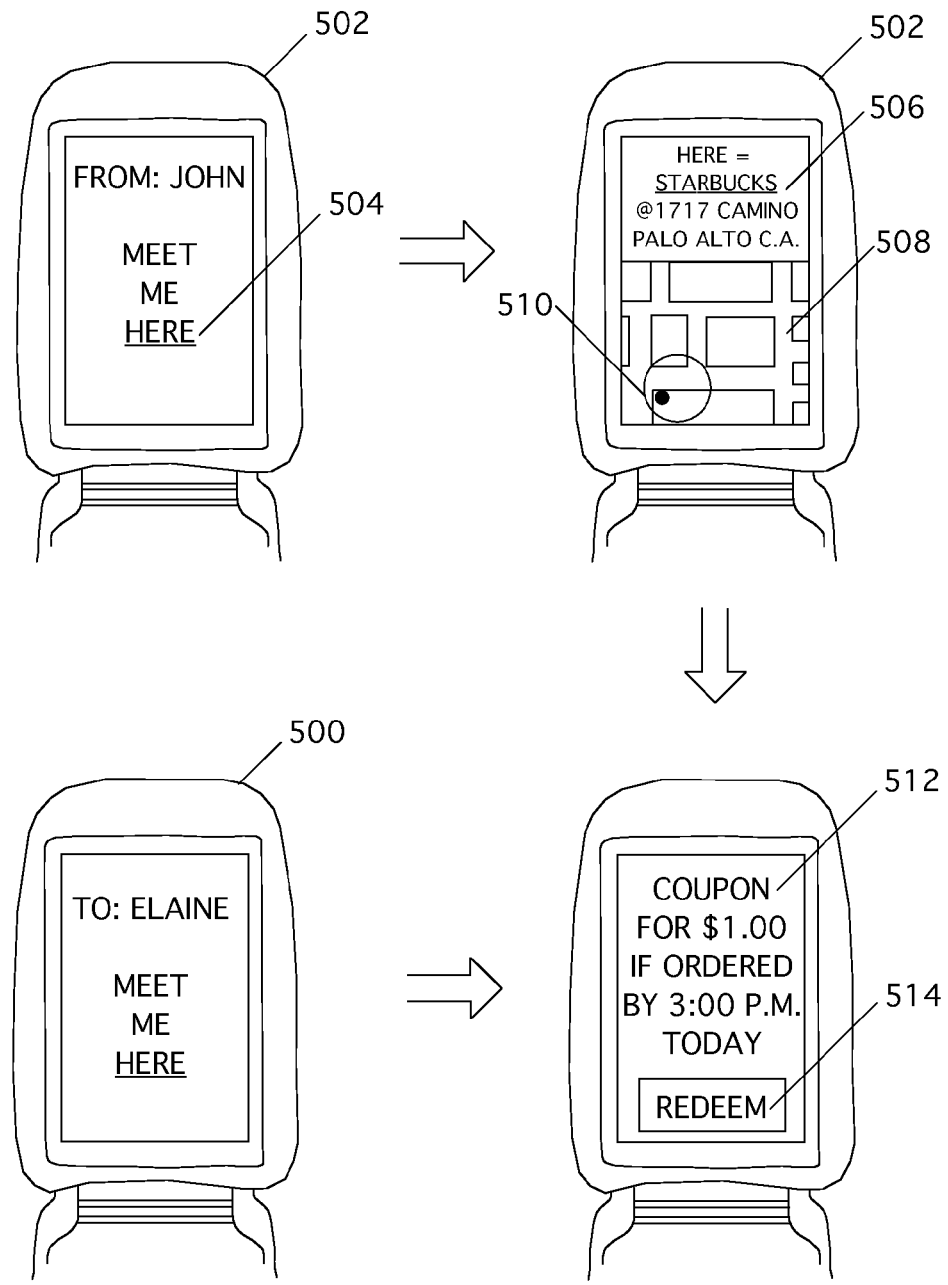
FIG. 5 illustrates an example of incentive marketing with a context-enriched message, according to an example embodiment.

FIG. 5 illustrates an example of one embodiment of incentive marketing with a context-enriched message. John generates a context-enriched message with mobile device 500. John utilizes a functionality of the mobile device 500 to associate the term 'here' with a location of the mobile device 500. In this particular example, the location may be a Starbucks™ cafe in Palo Alto, Calif. The mobile device 500 transmits the context-enriched message to Elaine's mobile device 502. For example, the systems and operations of FIG. 1-6 may be utilized to communicate the context-enriched message according to several various embodiments. Elaine's mobile device 502 then renders the context-enriched message with a GUI. For example, the GUI may render a hyperlink embedded in the term 'here'. In one embodiment, Elaine may utilize this hyperlink to navigate to a website with a web browser. The website may be hosted and configured by the incentive-marketing server 118. The website comprises components 506, 508 and 510. Component 506 provides a meaning for the term 'here' and includes address information. Component 508 comprises a map representation of the location. Component 510 shows the location data converted into pixel data that displays an icon representing the location of the mobile device 500 on the map. The map may be provided by either the incentive-marketing server 118 and/or a separate map server. Component 506 may include a hyperlink to a webpage that provides a marketing incentive in the form of a virtual coupon 512. In an example embodiment, the mobile device 502 may communicate to the incentive-marketing server 118 that Elaine has accessed the marketing incentive webpage with components 506, 508 and 510. The incentive-marketing server 118 then communicates the virtual coupon to John's mobile device 500 where it can be displayed as well. Component 514 allows the virtual coupon to be redeemed.

For example, component 514 may include a hyperlink to a webpage displaying a printable form of the coupon. In another example, component 514 may include an instruction that is communicating to a Starbuck's server that provides the one dollar credit to the redeemer if the redeemer is located in the particular Starbuck's location associated with the term 'here' in the context-enriched message.

Figure 6:
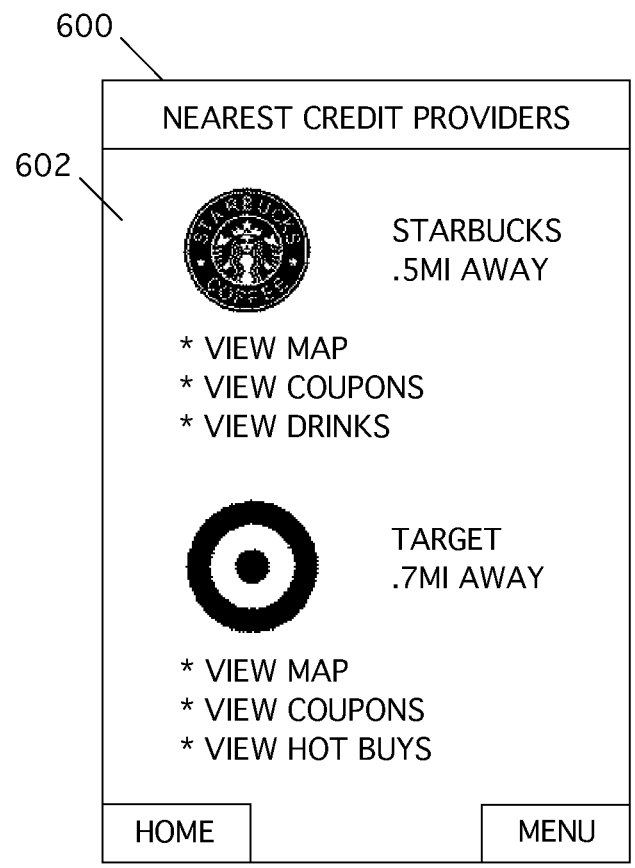
FIG. 6 illustrates an example display provided by the incentive-marketing server, according to an example embodiment.

FIG. 6 illustrates an example display 600 provided by the incentive-marketing server, according to one embodiment. The display 600 includes a list of the nearest vendors 602 that are participating in an incentive-marketing program. For example, mobile device 102 of an enrolled user may include an incentive-marketing application. The incentive-marketing application provides the location of mobile device 102 to the incentive-marketing server 118. The incentive-marketing server 118 then communicates an MMS message that includes the display 600. The user of mobile device 102 can then choose to associate a vendor with a message component as context-data. The user can view marketing incentives provided by the vendors by navigating to websites provided as hyperlinks in GUI display 600.

Figure 7:
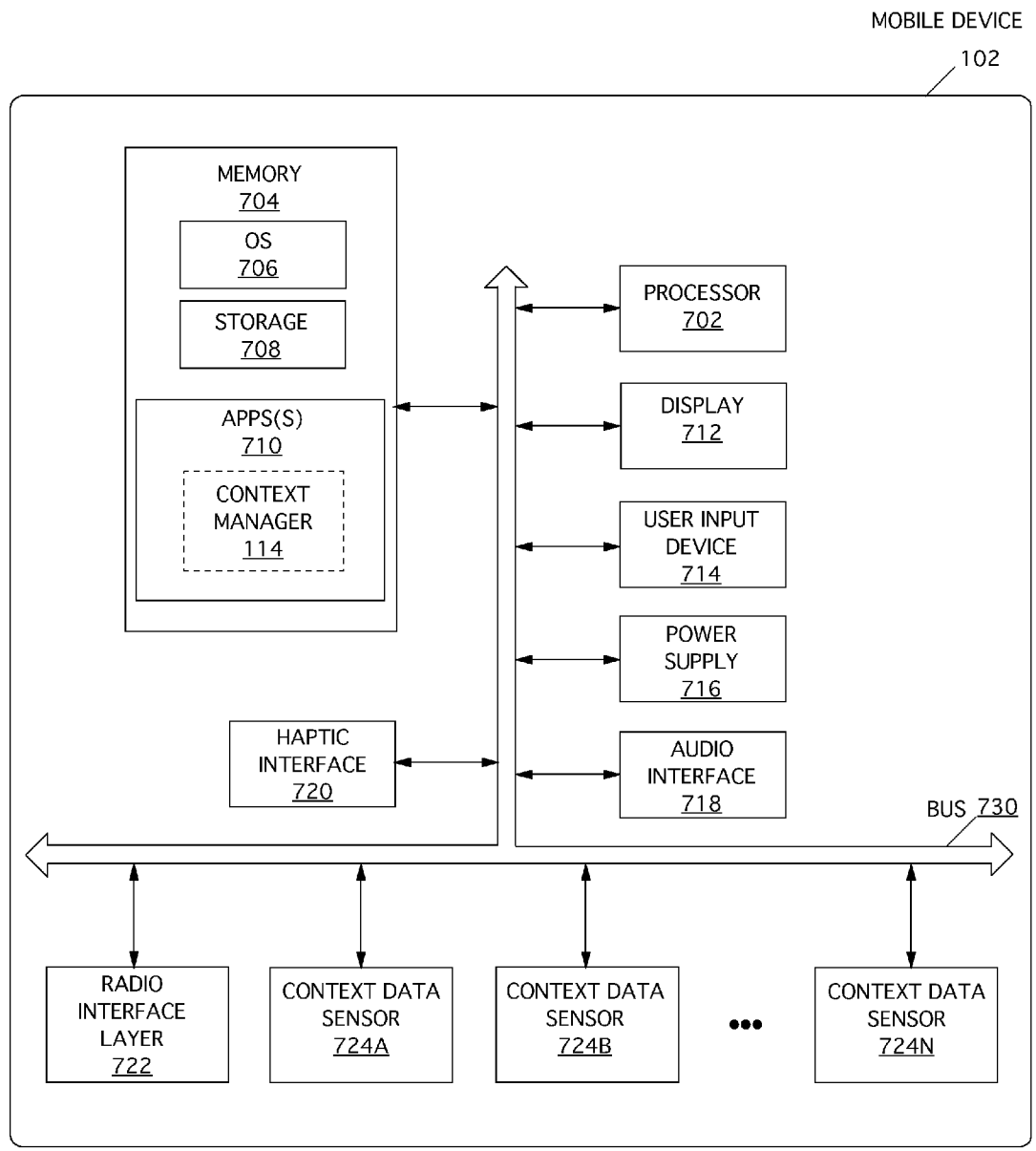
FIG. 7 illustrates a functional block diagram of an example mobile device, according to one or more embodiments.

FIG. 7 illustrates a functional block diagram of an example mobile device, such as mobile device 102, according to one embodiment. In one embodiment, the mobile device 102 may be a smart-phone system. It should be noted that in other example embodiments, any type of computing device (e.g. a personal computer, a tablet computer, a portable media player, personal digital assistant, and/or Wi-Fi mobile platform) may perform the same functions as the mobile device 102. Consequently, FIG. 7 should not be interpreted as being exclusive only to mobile devices with regards to other example embodiments.

The mobile device 102 includes a processor 702. The processor 702 may execute software programs resident in the memory 704. The memory 704 includes both volatile memory (e.g., RAM) and non-volatile memory (e.g., ROM, Flash Memory, or the like). An operating system 706 is resident in the memory 704. The operating system 706 executes on the processor 702 and manages the activities and the sharing of the resources of the mobile device 102. In one embodiment, the user input device 714 may be a push button numeric dialing pad (such as on a typical telephone). In another embodiment, the user input device 714 may be a multi-key keyboard (such as a conventional keyboard or a keyboard scaled for optimized "thumbing"). In yet other example embodiments, input may accomplished by orienting the mobile device in certain patterns and/or by, voice-input commands. The display 712 may be a liquid crystal display, or any other type of display commonly used in mobile devices. The display 712 may be touch-sensitive (e.g. a capacitive touchscreen), and would then include an input device. One or more application programs 710 are loaded into memory 704 and run on the operating system 706. In one example embodiment, the application programs 710 may include, inter alia, context applications such as context acquisition and analysis functionalities (e.g. in a context manager 114 resident in the memory 704) and/or machine-learning system applications (not shown). Utilities may also be included in the memory 704, such as utilities that assist the application programs 710 to implement the operations of FIGS. 2-6.

In certain embodiments, the context applications gather data from at least one context-data sensor 724 A-N. The context applications may analyze user input (such as a message and/or user instructions related to a chosen context data to associate with a message component). The context manager 114 may then determine a context data to associate with a message component.

Other example application programs 710 include phone dialer programs, email programs, scheduling programs, PIM (personal information management) programs, word processing programs, spreadsheet programs, Internet browser programs, instant messaging programs, user interfaces, commercial smart-phone applications, Voice over Internet Protocol (VoIP) applications, voice mail applications, short voice messaging applications, voice SMS applications, instant messaging applications, voice recognition functionalities, sound recognition functionalities, voice-to-text functionalities, machine-learning functionalities, gesture-based computer interface applications, and so forth. In one example embodiment, the context data and/or supplemental data about the context-data may be acquired from these application programs 710.

The mobile device 102 also includes storage 708 within the memory 704. In one embodiment, the storage 708 may be a non-volatile form of computer memory. The storage 708 may be used to store persistent information which should not be lost if the mobile device 102 is powered down. In another example embodiment, the storage 708 may store context data information such as data derived from a context-data sensor described infra and/or historical context data.

The applications 710 may use and store information in the storage 708, such as e-mail or other messages used by an e-mail application, contact information used by a PIM, appointment information used by a scheduling program, documents used by a word processing program, instant messaging information used by an instant messaging program, context data, context data metrics, voice message use by a voice messaging system, text message used by a text messaging system and the like. The mobile device 102 has a power supply 716, which may be implemented as one or more batteries. The mobile device 102 is also shown with an audio interface 718 and a haptic interface 720. The audio interface 718 may provide audible signals to and receive audible signals from the user. For example, the audio interface 718 may be communicatively coupled to a speaker for providing audible output and to a microphone for receiving audible input, such as to facilitate a telephone conversation. The haptic interface 720 may be used to provide haptic signals to the user. The mobile device 102 also includes a radio interface layer 722 that performs the function of transmitting and receiving radio frequency communications. The radio interface layer 722 facilitates wireless connectivity between the mobile device 102 and the outside world, via a communications carrier or a service provider. Transmissions to and from the radio interface layer 722 are conducted under control of the operating system 706. Communications received by the radio interface layer 722 may be disseminated to application programs 710 via the operating system 706, and vice versa.

The mobile device 102 further includes at least one context data sensor 724 A-N. In one embodiment, the context-data sensor 724 A-N may be a device that measures, detects or senses an attribute of the mobile device's environment and then converts the attribute into a signal which can be read by a context analysis application (such as the context manager 114). Example context-data sensors include, inter alia, global positioning system receivers, accelerometers, inclinometers, position sensors, barometers, WiFi sensors, RFID sensors, gyroscopes, pressure sensors, pressure gauges, time pressure gauges, torque sensors, ohmmeters, thermometers, infrared sensors, microphones, image sensors (e.g. digital cameras), biosensors (e.g. photometric biosensors, electrochemical biosensors), capacitance sensors, radio antennas and/or capacitance probes. It should be noted that the other sensor devices other than those listed may also be utilized to sense context data. In other certain example embodiments, context data may also include a signal comprising information about another mobile device and/or an external computing system such as the message server 110 and the incentive-marketing server 118, a third-party server (e.g. an Internet map server) or a database (e.g. the storage 708 and/or a database external to the mobile device 102). The bus 730 may be a subsystem that transfers data between computer components. In operation, information acquired by the context-data sensors may be processed by the various applications 710 in order to assist in determining a context of the mobile device 102.

Figure 8:
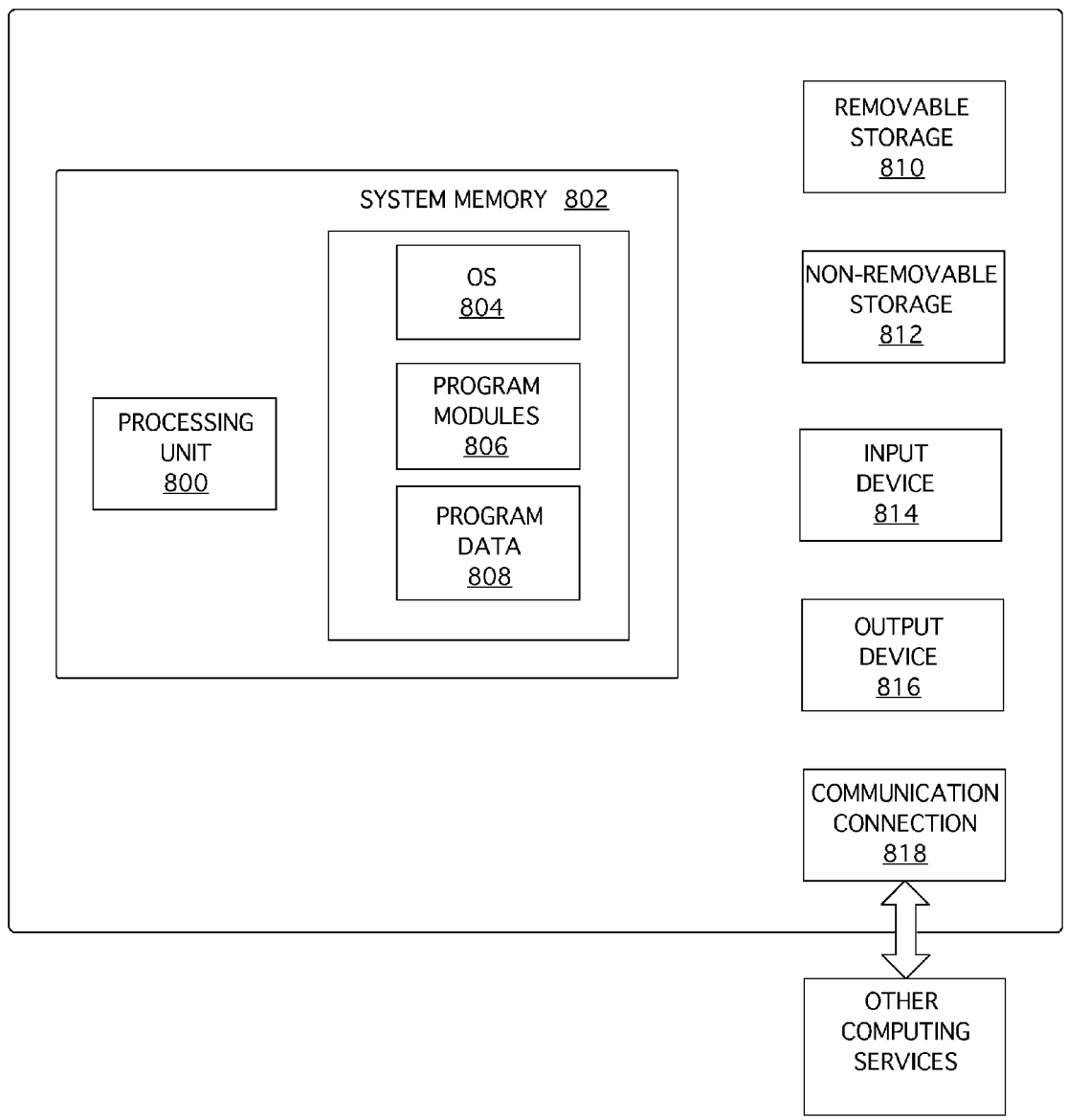
FIG. 8 illustrates a block diagram of a computer operable to execute the various embodiments of FIGS. 1-6, according to one or more embodiments.

FIG. 8 illustrates a block diagram of a computer, such as the message server 110, the incentive-marketing server 118 and a vender server, operable to execute the various embodiments of FIGS. 1-6. In a basic configuration, the computer typically includes at least one processing unit 800 and system memory 802. Depending on the exact configuration and type of computing device, system memory 802 may be volatile (such as RAM), non-volatile (such as ROM, flash memory, etc.) or some combination of the two. The system memory 802 generally includes an operating system 804, one or more program modules 806, and other program data 808. The system memory 802 may also include any of the applications described above in reference to the mobile device 102 of FIG. 7. The computer may also provide a resource to scale the operations, processing power and battery resources of the mobile devices 102, 106, 128 and 130. In other embodiments, the computer may also be utilized to acquire, determine, rank and associate various context-data from multiple mobile device sources. Additionally, the computer may utilize a data store (e.g. the data bases 112 and 120 of FIG. 1) to scale the data storage resources of mobile devices 102, 106, 128 and 130) implemented in the example network illustrated by FIG. 1 supra.

The computer may have additional features or functionalities. For example, the computer may also include additional data storage devices (removable and/or non-removable) such as, for example, magnetic disks, optical disks, or tape. Such additional storage is illustrated in FIG. 8 by removable storage 810 and non-removable storage 812. Example, computer storage media may include volatile and nonvolatile, removable and non-removable media implemented in any method or technology for storage of information, such as computer readable instructions, data structures, program modules, or other data. The system memory 802, removable storage 810 and non-removable storage 812 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, firmware, magnetic disk storage or other magnetic storage devices, or any other medium which storage media may be part of the computer. These computer storage media may include computer-executable instructions for implementing the various embodiments described herein. The computer may also have input device(s) 814 such as a keyboard, a mouse, a pen, a voice input device, a gesture-based interface and/or a touch-sensitive input device. Output device(s) 816 such as a display, speakers, printer, etc. may also be included.

The computer may also include communication connections 818 that allow the device to communicate with other computing devices over the communication network 100. Communication connections 818 are one example of communication media. Communication media may typically be embodied by computer readable instructions, data structures, program modules, or other data in a modulated data signal, such as a carrier wave or other transport mechanism, and includes any information delivery media. The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. The computer readable media as used herein may include both storage media and communication media according to various example embodiments. In an example embodiment, the computer may provide instructions to a mobile device 102 to acquire and analyze certain context-data and then communicate the context-data to the computer.

By way of explanation and not of limitation, still yet other examples are now described. These examples are intended as other possible implementations of the systems and methods of FIGS. 1 to 8 and are illustrative in nature.

In a first example, a context manager 114 may analyze a message and detect an ambiguity between the meaning of a message component and a context of the mobile device 102. For example, four Starbucks™ cafes may be within five miles of the present location of John. John wants to meet Elaine and messages "Meet me at Starbucks" to her with his mobile device. The handset app detects ambiguity (i.e. "which Starbucks?") and lists four different Starbucks's along with the credit incentives structures for each cafe. For example, Starbucks A may offer a free latte if John associates its location with the message term 'Starbucks'. Starbucks B and C may not provide incentives. Starbucks D may offer a $1.00 virtual coupon if John associates its location with the message term 'Starbucks'. Therefore, John has an incentive to choose Starbucks A. The systems and operations of FIGS. 1-8 may be utilized to implement this particular example.

In another example, John is not a member of the Starbucks incentive-marketing program. He is currently at a Starbucks and wants Elaine to meet him there. John texts, "Meet me here." A Starbucks server may detect John's mobile device in the Starbuck's location. The Starbucks server may communicate a message to John's mobile device with information as to how to join the Starbucks incentive-marketing program with an initial offer of a credit reward for joining. The message server 110 may detect the incoming message from the Starbuck server. The message server 110 may communicate the message to John's mobile device if the John associates location context data with the term 'here' while in a Starbucks cafe. The systems and operations of FIGS. 1-8 may be utilized to implement this particular example.

In yet another example, Elaine is at Bloomingdales browsing through the purses section. She finds a purse that she absolutely loves. Elaine texts her sister, "I love this purse" and scans the barcode on the price tag through her mobile device's video recorder. A context manager 114 associates the barcode information as context data with the words "this purse." Location context data is also automatically uploaded to the messaging server 110. The message server 110 provides this information to a Bloomingdales's server that Elaine wants the purse. The Bloomingdales's server communicates a message (e.g. an ad message provided via the incentive-marketing server 118) inviting Elaine to join a Bloomingdales incentive-marketing program. The Bloomingdales incentive-marketing program can provide Elaine with multiple options on how to get the purse she desires. For example, the Bloomingdales incentive-marketing program could provide Elaine the option of photographing other items in the store and messaging the photographs to members of her social network. Elaine could then receive credit towards the price of the purse if the message recipients perform certain actions such as browse a Bloomingdale's website, purchase items represented in the photographs, etc. The systems and operations of FIGS. 1-8 may be utilized to implement this particular example.

Although the present embodiments have been described with reference to specific example embodiments, various modifications and changes may be made to these embodiments without departing from the broader spirit and scope of the various embodiments. For example, the various devices, modules, etc. described herein may be enabled and operated using hardware circuitry, firmware, software or any combination of hardware, firmware, and software (e.g., embodied in a machine-readable medium).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
   acquiring a message generated with a mobile device;
   algorithmically determining an environmental context of the mobile device wherein a type of the environmental context depends on a meaning of a message component of the message;
   acquiring a context data obtained with a sensor of the mobile device, wherein the context data is derived from the environmental context of the mobile device;
   acquiring an advertisement component related to both the environmental context of the mobile device and the message component, wherein the advertisement component is selected based on the meanings of the context data and the message component; and
   communicating the advertisement component to mobile device that originated the message and a device addressed by the message.

2. The method of claim 1 further comprising:
   rendering the ad message and the other message with a user interface.

3. The method of claim 1 further comprising:
   determining whether a recipient mobile device rendered the ad message with the user interface.

4. The method of claim 3 further comprising:
   determining whether the recipient mobile device of the other message accessed the ad message via a hyperlink embedded within a display element of the other message.

5. The method of claim 3 further comprising:
   awarding a credit to an account associated with the mobile device used to generate the other message if the recipient mobile device accessed the ad message.

6. The method of claim 1, wherein the context-data comprises a global positioning system (GPS) location data of an entity that awards the credit.

7. The method of claim 1, wherein the other message comprises a multimedia messaging service (MMS) message.

8. The method of claim 1 further comprising communicating the other message and the ad message to the recipient mobile device.

9. The method of claim 1, wherein a machine is caused to perform the method of claim 1 when a set of instructions in a form of a non-transitory computer-readable medium is executed by the machine.

10. A computer-implemented method comprising:
    receiving, with at least one server, a message;
    parsing the message;
    receiving, with the at least one server, a context data, wherein a type of the context data depends on a meaning of a word or clause of the message, wherein the context data describes an environmental condition of a device that generated the message;
    associating the context data with the word or clause in the message;
    obtaining an announcement pertaining to the context data found in the message received by the at least one server, wherein the ad announcement is selected based on the meanings of the context data and the meaning of the word or clause of the message;
    associating the ad announcement with the message;
    generating a context-enriched message that comprises the ad announcement, the message and the context data; and
    rendering the context-enriched message into a format for communication to the device that generated the message and a device targeted by the message.

11. The computer-implemented method of claim 10, wherein the message is a short messaging service (SMS) message or a multimedia messaging service (MMS) message.

12. The computer-implemented method of claim 10 further comprising:
    delivering the context-enriched message to a receiving computing device.

13. The computer-implemented method of claim 12, wherein the announcement comprises an advertisement provided by a third party.

14. The computer-implemented method of claim 13, wherein the third-party provides a credit-based system that awards a credit to an account associated with a computer used to generate the message if the advertisement is presented with the receiving mobile device.

15. The computer-implemented method of claim of 10, wherein the context data is obtained from a sensor of a mobile device that generated the message.

16. A computerized system comprising:
    a context manager component that determines a mobile-device context depending on a meaning of a message element, wherein the message element is generated by the mobile device, and wherein the mobile-device context comprises an environmental context of the mobile device;
    a message manager component that determines the meaning of the message element pertaining to the mobile-device context; and
    an incentive-marketing component that acquires an advertise depending on the meaning of the message element and the environmental context of the mobile device and another environmental context of a device addressed by a message that comprises the message element.

17. The computerized system of claim 16, wherein the message is a multimedia message.

18. The computerized system of claim 16, wherein the message manager component configures a message comprising the message and the advertisement.

19. The computerized system of claim 16, wherein the the advertisement is communicated to a mobile device addressed by the message.

20. The computerized system of claim 16, wherein the incentive-marketing component determines the advertisement based on the meaning of the message element and an environmental context of the receiving mobile device.

21. The computerized system of claim 16, wherein the database-context manager component links the mobile-device context with the message.

22. A method comprising:
receiving, with least one server, a text message generated with a essaging application of a mobile device;
receiving a context data associated with the text message, wherein the context data describes an environmental condition of the mobile device as obtained by a sensor coupled with the mobile device, and wherein the context data is related to a meaning of the text message;
acquiring a merchant coupon related to the context data associated with the message and the meaning of the text message; and
communicating a another message that comprises the merchant coupon to the mobile device or another mobile device to which the text message was addressed.

\* \* \* \* \*